No. 784,198. PATENTED MAR. 7, 1905.
J. G. WOODS.
LOGGING WAGON.
APPLICATION FILED OCT. 29, 1904.
2 SHEETS—SHEET 1.
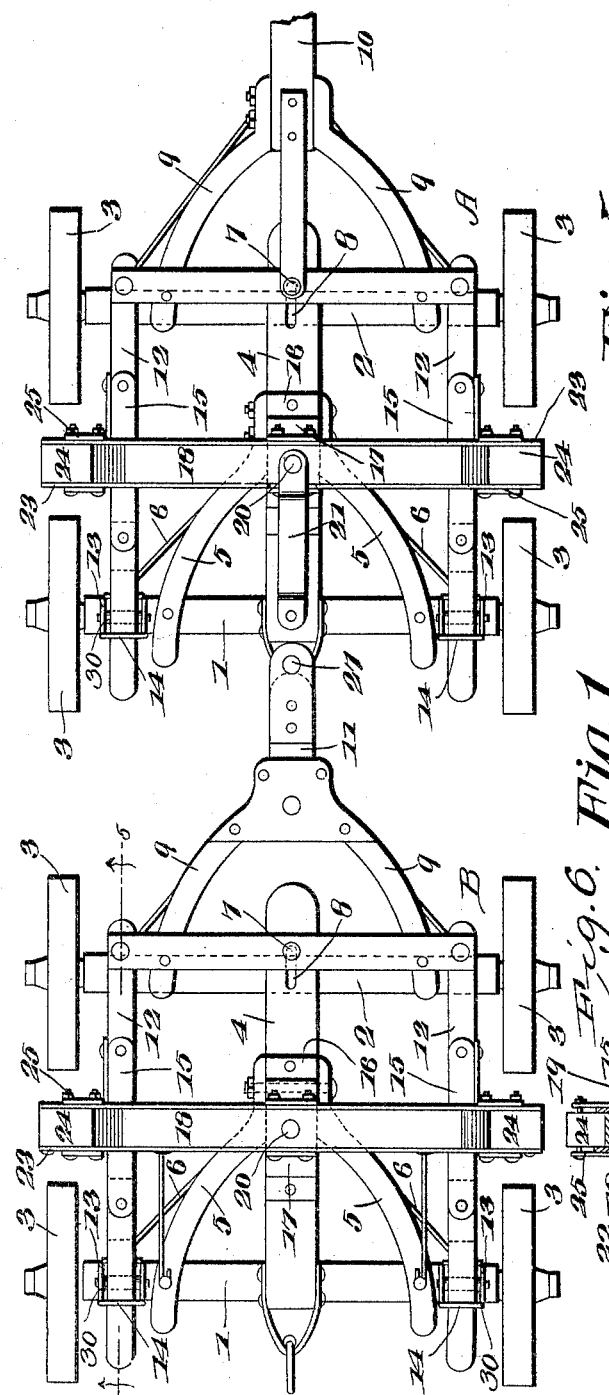
Witnesses
James G. Woods, Inventor
by C. A. Snow & Co.
Attorneys

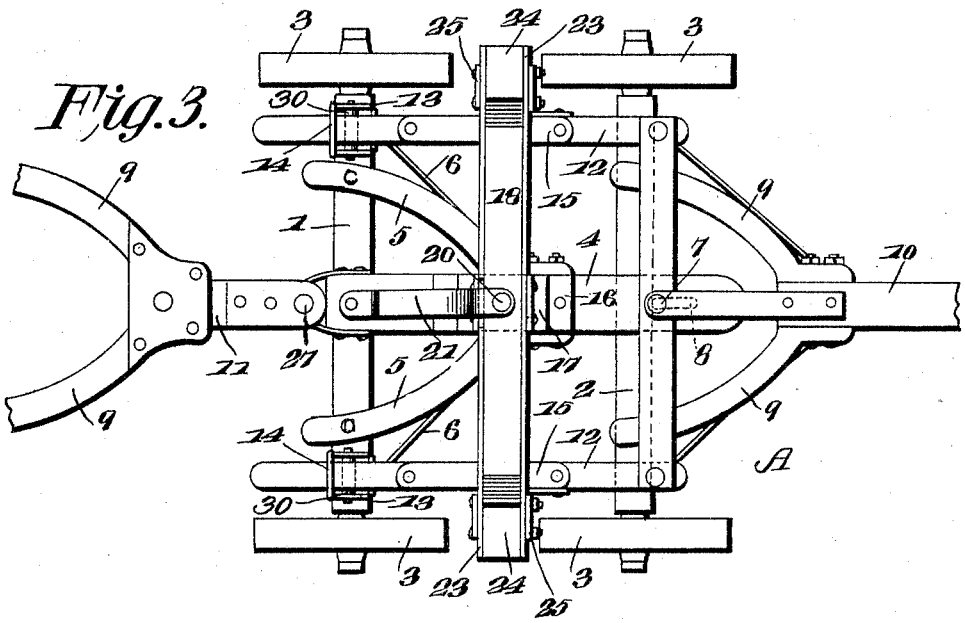
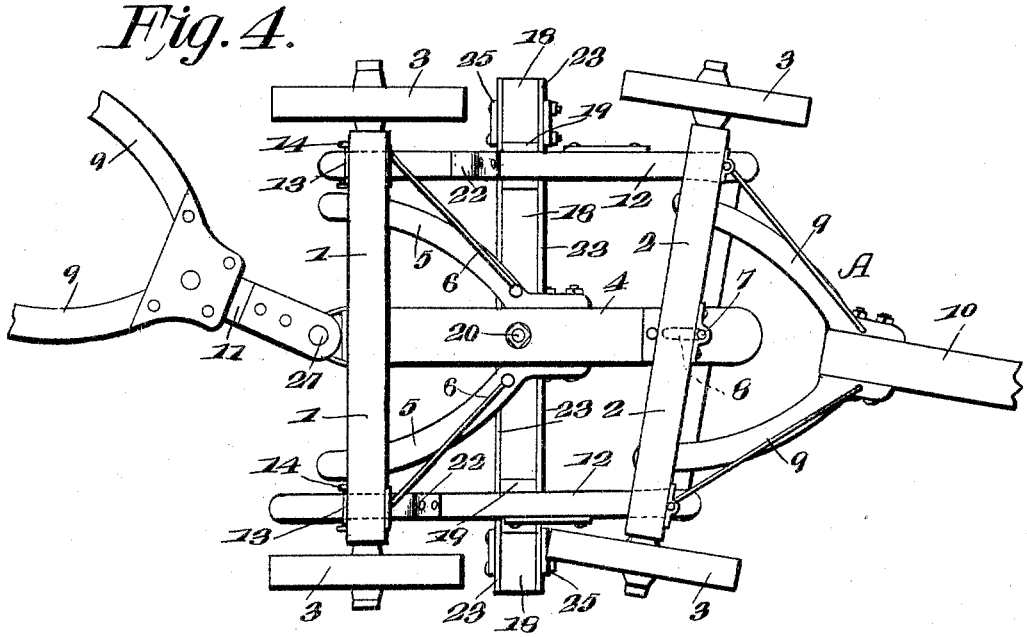

No. 784,198.

Patented March 7, 1905.

UNITED STATES PATENT OFFICE.

JAMES G. WOODS, OF HATTIESBURG, MISSISSIPPI.

LOGGING-WAGON.

SPECIFICATION forming part of Letters Patent No. 784,198, dated March 7, 1905.

Application filed October 29, 1904. Serial No. 230,543.

*To all whom it may concern:*

Be it known that I, JAMES G. WOODS, a citizen of the United States, residing at Hattiesburg, in the county of Perry and State of Mississippi, have invented a new and useful Logging-Wagon, of which the following is a specification.

This invention relates to logging-wagons, and especially to that class of logging-wagons which are composed of two separate trucks, each mounted upon four wheels. These logging-wagons are usually of low and bulky construction, whereby they are especially adapted to the object in view.

The object of the present invention is to facilitate the turning and also the backing of the wagon, which latter oftentimes proves a difficult operation with wagons of the present construction.

To attain the objects of the invention, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a plan view of a logging-wagon constructed in accordance with the principles of the invention. Fig. 2 is a longitudinal sectional view of the same. Fig. 3 is a top plan view showing the front truck and the connecting-reach in position for backing. Fig. 4 is a bottom plan view showing the same in position for turning. Fig. 5 is a sectional view of one of the axles. Fig. 6 is a side elevation, partly in section, of one of the trucks.

Corresponding parts in the several figures are indicated by like characters of reference.

The improved logging-wagon of the invention is composed of a front and a rear truck, (designated, respectively, A and B;) but inasmuch as these trucks are constructed exactly alike the description of a single one will suffice, and the characters of reference applied to the one will apply equally to the other.

Each truck then is composed of a rear axle 1 and a front axle 2, said axles being provided at the ends thereof with spindles on which the transporting-wheels 3 are mounted. The rear axle supports a reach 4, which is firmly secured thereon and connected therewith by means of hounds 5 and braces 6. The front end of the reach 4 is supported upon the front axle 2, which is provided with a king-bolt 7, extending upwardly through a slot 8 in the forward end of the reach, which is thus mounted slidably upon the front axle. The front axle supports a pair of forwardly-converging hounds 9 9. Between the hounds of the front truck A is mounted a tongue 10. Between the hounds of the rear truck B is mounted a coupling member or reach 11, the front end of which is flexibly connected with the rear end of the reach 4 of the front truck. The trucks may be used interchangeably, and more than two trucks may be coupled together when desired.

Connected pivotally with the front axle of each truck are a pair of slide-bars 12 12, the forward ends of which are supported upon said front axle and the rear ends of which are supported slidably upon the rear axle, which is provided with guide-plates 13 adjacent to said slide-bars and with retaining-yokes 14, whereby the said slide-bars are prevented from being displaced. These slide-bars are provided upon their upper sides with wear-plates 15. A wear-plate 16 is likewise placed upon the reach 4, said wear-plate serving to support a pivoted yoke 17, in which the bolster 18 is secured, said bolster being provided on its under sides with wear-plates 19, engaging the wear-plates 15, thereby reducing friction and preventing excessive wear when the bolster turns upon its pivotal bolt 20. The latter is braced by means of a strap 21.

Firmly secured upon the under sides of the slides 12 are blocks 22, which when said slides are moved in a rearward direction will abut upon the front side of the rear axle. When the slides are moved forwardly, the blocks 22 will be spaced from the rear axle, as will be clearly seen in Fig. 2 of the drawings.

The bolsters 18 are provided at their upper edges with flanges 23, between which are mounted the bolster-blocks 24, which latter are connected with the bolsters by means of links 25 in the usual manner to enable said blocks to be properly adjusted to secure the load in position upon the trucks.

From the foregoing description it will be seen that the trucks may be readily connected with each other by means of a pin or bolt 27, whereby a flexible connection is formed. When draft is exerted in a forward direction, the front axles of the trucks will move forwardly until the pins 7 occupy the forward ends of the slots 8. By the same movement of the axle the slides 12 are drawn forwardly until the blocks 22 are spaced from the rear axles, as will be clearly seen in Fig. 2 of the drawings. When the parts are in this position, it is obvious that the front axle of each truck will readily turn upon its king-pin 7, as will be best seen in Fig. 4 of the drawings, thus enabling the wagon to be guided properly as it progresses. When it shall be desired to back the wagon, the front axles of the trucks will move in a rearward direction until the blocks 22 of the slides 12 abut upon the rear axles. When the parts are in this position, a continued exercise of the backing movement will result in squarely backing the trucks, for the reason that the blocks 22 of the slides 12 abutting upon the rear axles will prevent the front axles from turning upon their king-pins, and the load will thus be squarely backed.

The guide-plates 13 are preferably provided with rollers 30, which serve to support the slide-bars 12 in such a manner as to avoid undue friction, and thus facilitating the operation of the device.

In Fig. 5 of the drawings has been shown a sectional view of the preferred form of axle used in connection with the invention. Said axle, which may be a rear axle 1, is made of wood, and it is provided with a truss-rod 32, extending through the thimble-skeins 33, which are secured in position by means of nuts 34 upon the threaded ends of said truss-rod. This construction is extremely simple and durable as well as inexpensive.

This invention, as will be seen from the foregoing description, is extremely simple as to the construction thereof and at the same time entirely efficient for the purposes set forth.

Logging-wagons equipped with this invention may be constructed at a cost not necessarily exceeding that of wagons not thus equipped, and the invention may be at a moderate expense applied to old wagons.

Having thus described the invention, what is claimed is—

1. A truck for logging-wagons including a rear axle, a front axle slidably connected therewith, slides pivotally connected with the front axle, and blocks upon said slides adapted to abut upon the front side of the rear axle.

2. A truck for logging-wagons including a rear axle, a reach firmly connected therewith, a front axle having slidable connection with the reach, and slides connected pivotally with the front axle and supported slidably upon the rear axle, said slides having members adapted to abut upon the front side of said rear axle when the front axle is moved rearward.

3. A truck for logging-wagons including a rear axle, a reach securely connected therewith, a front axle having slidable connection with the reach, slides connected pivotally with the front axle, supported slidably upon the rear axle and having members adapted to abut upon the front side of the latter, and slide-guiding flanges and retaining-yokes connected with the rear axle.

4. A logging-wagon including a plurality of trucks each comprising a rear axle, a reach firmly connected with said rear axle, a front axle slidably connected with the reach, and slides pivotally connected with the front axle, supported slidably upon the rear axle and having members adapted to abut upon the front side of the latter, hounds connected with the front axles, a tongue connected with the hounds of the front truck, and a coupling member connecting the hounds of the rear truck with the rear end of the reach of the front truck.

5. In a logging-wagon, a truck including a rear axle, a reach connected firmly with said rear axle, hounds and braces connecting said reach with the axle, a front axle having a bolt extending through and slidably connected with a slot in the reach, slides connected pivotally with the front axle supported slidably upon the rear axle, and having blocks to abut upon the front side of the rear axle and to establish rigid connection between the front and rear axles when the vehicle is backed, wear-plates upon said slides and upon the reach, a pivotal bolt extending through the reach, a yoke pivoted upon said pivotal bolt, a bolster mounted in the yoke, and wear-plates upon the under side of said bolster engaging the wear-plates upon the slides.

6. A truck for logging-wagons including a rear axle, a reach securely connected therewith, a front axle having slidable connection with the reach, slides connected pivotally with the front axle, rotary supporting means for said slides connected with the rear axle, blocks depending from the slides and adapted to abut upon the front side of the rear axle, and slide-retaining yokes upon the rear axle.

In testimony that I claim the foregoing as my own I have hereto affixed my signature in the presence of two witnesses.

JAMES G. WOODS.

Witnesses:
A. S. WOODS,
W. C. BENNETT.